US011286697B2

(12) United States Patent
Trentin

(10) Patent No.: US 11,286,697 B2
(45) Date of Patent: Mar. 29, 2022

(54) HINGE ASSEMBLY FOR A TAILGATE OF A VEHICLE

(71) Applicant: Ford Global Technologies, LLC, Dearborn, MI (US)

(72) Inventor: Daniel Trentin, Ivanhoe (AU)

(73) Assignee: Ford Global Technologies, LLC, Dearborn, MI (US)

(*) Notice: Subject to any disclaimer, the term of this patent is extended or adjusted under 35 U.S.C. 154(b) by 360 days.

(21) Appl. No.: 16/558,840

(22) Filed: Sep. 3, 2019

(65) Prior Publication Data

US 2020/0087962 A1 Mar. 19, 2020

(30) Foreign Application Priority Data

Sep. 14, 2018 (CN) .......................... 201811072519.5

(51) Int. Cl.
*E05D 11/00* (2006.01)
*B62D 33/027* (2006.01)
*E05D 7/10* (2006.01)
*E05D 3/02* (2006.01)

(52) U.S. Cl.
CPC .......... *E05D 11/00* (2013.01); *B62D 33/0273* (2013.01); *E05D 3/02* (2013.01); *E05D 7/10* (2013.01); *E05Y 2900/544* (2013.01)

(58) Field of Classification Search
CPC .. E05D 11/00; E05D 3/02; E05D 7/10; B62D 33/0273; E05Y 2900/544
See application file for complete search history.

(56) References Cited

U.S. PATENT DOCUMENTS

| 3,237,239 | A | 3/1966 | Rudnick |
| 5,027,474 | A | 7/1991 | Bowers |
| 5,477,590 | A | 12/1995 | Grabher |
| 5,988,724 | A | 11/1999 | Wolda |
| 9,126,642 | B2 | 9/2015 | Hausler et al. |
| 2018/0264978 | A1* | 9/2018 | Salenbien .............. B60N 2/366 |

FOREIGN PATENT DOCUMENTS

GB 1356907 6/1974

* cited by examiner

*Primary Examiner* — D Glenn Dayoan
*Assistant Examiner* — Melissa Ann Bonifazi
(74) *Attorney, Agent, or Firm* — Vichit Chea; Carlson, Gaskey & Olds, P.C.

(57) ABSTRACT

A hinge assembly can removably mount a tailgate to a vehicle. The hinge assembly includes a first bracket attached to a first part. The hinge assembly further includes an engagement member and a second bracket attached to a second part and including a resilient member. A pivot shaft pivotally connects the first and second brackets. The engagement member engages the resilient member when the first part is at a first position and disengages the resilient member when the first part is at a second position.

20 Claims, 9 Drawing Sheets

HINGE ASSEMBLY FOR A TAILGATE OF A VEHICLE

CROSS-REFERENCE TO RELATED APPLICATIONS

This application claims priority to CN Patent Application No. 2018110725195, which was filed on 14 Sep. 2018 and is incorporated herein by reference in its entirety.

TECHNICAL FIELD

The present disclosure relates to a hinge assembly for a tailgate of a motor vehicle. In particular, the present disclosure relates to a hinge assembly with an anti-rattling mechanism.

BACKGROUND

A truck typically has a closure member, such as, a tailgate pivotally mounted between the body side panels at the rear end of the vehicle. The tailgate pivots between open and closed positions about a hinge axis. Some trucks allow removal of a tailgate via a quick removal mechanism without the need for tools. A larger clearance usually exists within the pivot to allow for an off-axis manipulation of the tailgate to carry out the removal and greater manufacturing tolerance to prevent "pivot binding" during normal opening and closing of the tailgate. However, with the larger clearance, audible rattling can occur when driving over rough surfaces.

SUMMARY

According to one aspect of the present disclosure, a hinge assembly to connect a first part and a second part is provided. The hinge comprises a first bracket attached to a first part and including an engagement member; a second bracket attached to a second part and including a resilient member; and a pivot shaft pivotally connecting the first and second brackets. The engagement member is configured to engage the resilient member when the first part is at a first position and disengage the resilient member when the first part is at a second position.

In one embodiment, the first bracket may include a cup. The cup is configured to receive the pivot shaft. The engagement member may be connected on an outer surface of the cup and extend at a first direction substantially parallel to an axis of the pivot shaft. The resilient member may be a leaf spring extending at a second direction substantially perpendicular to the axis of the pivot shaft.

In another embodiment, the engagement member may be an annular rod attached to the outer surface of the cup.

In another embodiment, the engagement member may be a cam mounted on the outer surface of the cup, and an outer surface of the cam may have an arc shape and may be mounted at a position to enable the cam to contact the leaf spring such that a force is applied toward the pivot shaft when the first part is at the first position and the force is removed when the cam is spaced away from the leaf spring to allow removal of the force with a pivotal movement of the first part at the second position.

In another embodiment, the first part may be a tailgate of a truck, and the second part may be a sidewall of the truck. The first position is a position at which the tailgate is closed and the second position is a position at which the tailgate is opened.

According to another aspect of the present disclosure, a hinge assembly for connecting a tailgate to a sidewall of a vehicle is provided. The hinge assembly comprises a tailgate bracket and a body bracket. The tailgate bracket may include a first base, a cup extending from the first base and an engagement member connected to an outer surface of the cup. The body bracket may include a second base, a cantilever extending from the second base towards the tailgate bracket, a resilient member disposed on the cantilever and extending toward the engagement member and a pivot shaft connected to the second base and received in the cup. A free end of the resilient member contacts the engagement member to apply a force on the cup when the tailgate is at a closed position and the resilient member moves away from the engagement member when the tailgate is at an opened position.

In one embodiment, the resilient member may be a leaf spring and the first base may be substantially parallel to the second base.

In another embodiment, the leaf spring may be made from metal and the free end of the leaf spring may be enclosed by a protective cover and the protective cover may be a plastic part or a polymer part molded on the free end of the leaf spring. The free end of the leaf spring may include a curved lower surface corresponding to a moving path of the engagement member.

In another embodiment, a fixed end of the leaf spring may include a U-shaped portion and the U-shaped portion sits on the notch and sandwiches the cantilever such that the leaf spring is releasably connected to the cantilever.

In another embodiment, the engagement member may be a cam connected on the outer surface of the cup and positioned such that the cam engages the free end of the leaf spring when the tailgate is at the closed position and the cam is distant from the leaf spring to leave a clearance between the cam and the leaf spring at the opened position.

In another embodiment, the cam may be welded to the outer surface of the cup and the cam may include an arc segment.

In another embodiment, the engagement member may be an annular rod attached to the outer surface of the cup. The annular rod may extend from the first base of the tailgate bracket toward the body bracket and may be substantially parallel to an axis of the pivot shaft.

In another embodiment, the annular rod may be positioned at an upper portion of the cup and face the leaf spring at the closed position.

In another embodiment, the hinge assembly may further comprise a plastic sleeve extending on an outer surface of the cup at a circumferential direction and partially enclosing the cup. The sleeve may include a raised portion, an inner surface of the raised portion is configured to receive the annular rod and an outer surface of the raised portion is configured to interface the leaf spring. The outer surface may have a contour corresponding a shape of the free end of the leaf spring. The sleeve may also include a clipping feature to secure it from movement in the pivot direction when fitted.

In another embodiment, the tailgate bracket may further include a spacer positioned between the pivot shaft and the cup and the spacer may include a recess at an axial direction of the pivot shaft.

In another embodiment, the cup may have an opening along an axial direction of the pivot shaft, and the pivot shaft may have a rectangular cross section and a width of the pivot shaft is lesser than a width of the opening on the cup.

According to yet another aspect of the present disclosure, a truck having a hinge assembly to connect a tail gate to a box is provided. The truck comprises a bed portion; a first sidewall; a second sidewall; a tailgate connected to the first and second sidewalls and movable between an opened position and a closed position; and a first hinge assembly and a second hinge assembly to pivotally connect the tailgate to the first and second sidewalls, respectively. Each of the first and second hinge assemblies comprising a tailgate bracket connected to the tailgate and a bracket assembly connected to the first sidewall or the second sidewall. The tailgate bracket includes a first base substantially parallel to the first and second sidewalls, a cup connected to the first base and extending along a pivot axis of the tailgate; and an engagement member coupled to the tailgate bracket and extending along an outer surface of the cup. The body bracket includes a second base substantially parallel to and attached to the first sidewall or the second sidewall, a cantilever extending from the second base toward the tailgate bracket and spaced away from the cup, and a pivot shaft connected to the second base, extended from the second base and received in the cup, and a leaf spring. The leaf spring has a free end, a main body and a fixed end mounted to the cantilever. The engagement member engages the free end of the leaf spring when the tailgate is at a closed position and disengages the free end when the tailgate is at an opened position.

In one embodiment, the tailgate bracket may include a spacer disposed between the cup and the pivot shaft, and there is clearance between the spacer and the pivot shaft, and the spacer and the cup, to facilitate removal and installation, and allow for reduced friction during operation, of the tailgate to the first and second sidewalls. The spacer may be made from plastic material.

In another embodiment, the engagement member may be an annular rod connected to the tailgate bracket and the cup, and the annular rod extends along the pivot axis.

In another embodiment, the engagement member may be a cam connected to an outer surface of the cup and positioned such that the cam contacts the free end of the leaf spring at the closed position and is spaced away from the free end of the leaf spring at the opened position.

BRIEF DESCRIPTION OF THE FIGURES

The various features and advantages of the disclosed examples will become apparent to those skilled in the art from the detailed description. The figures that accompany the detailed description can be briefly described as follows.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed hinge assemblies to connect a tailgate to a box of a truck will become better understood through review of the following detailed description in conjunction with the figures. The detailed description and figures provide merely exemplary embodiments. Those skilled in the art will understand that the disclosed examples may be varied, modified, and altered. Many variations are contemplated for different applications and design considerations; however, for the sake of brevity, each and every contemplated variation is not individually described in the following detailed description.

Throughout the following detailed description, examples of various embodiments of the hinge assemblies are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
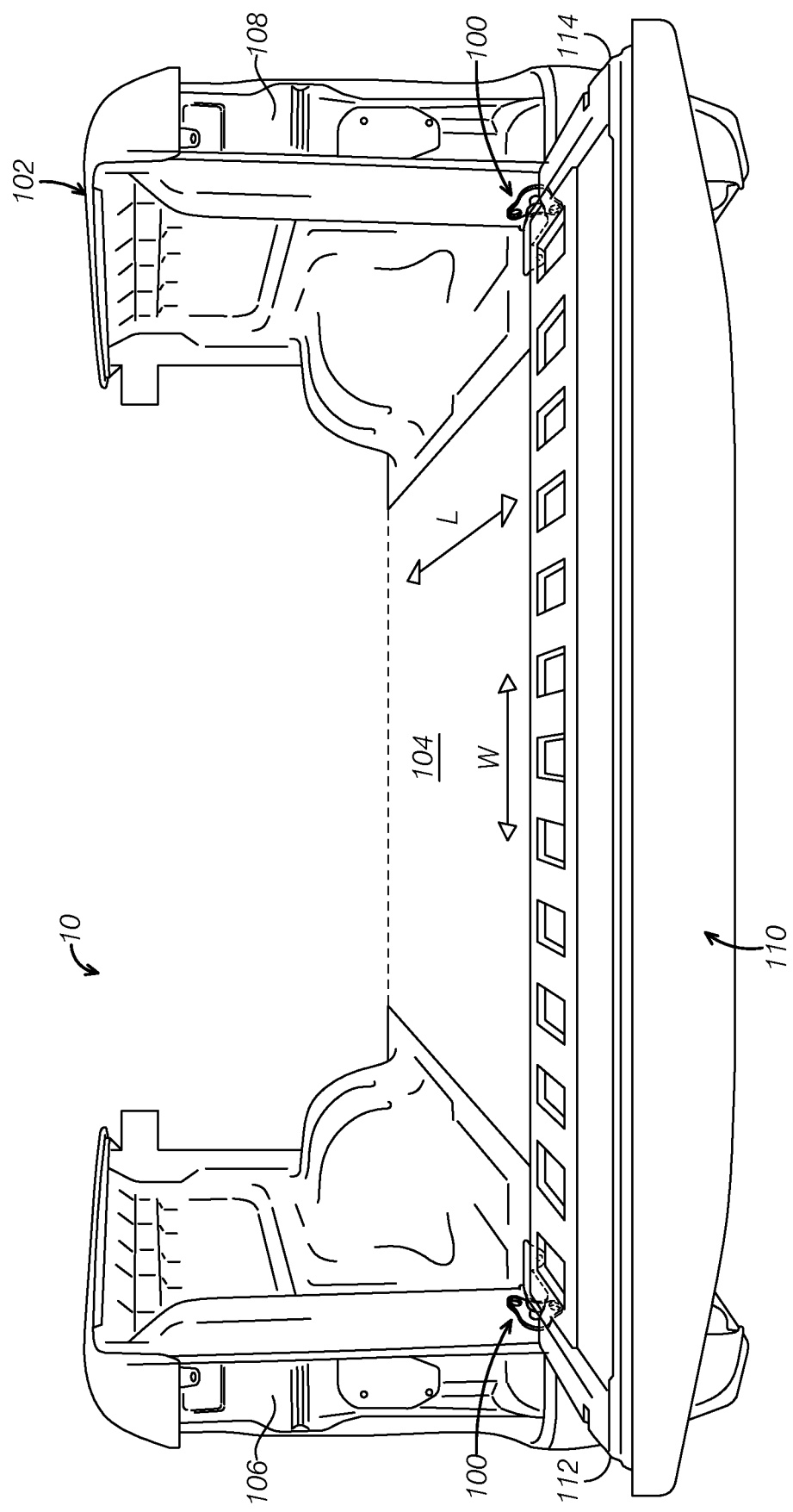
FIG. 1 is a partial perspective view of a truck having a hinge assembly according to one embodiment of the present disclosure.

FIG. 1 is a partial perspective view of a truck 10 having a hinge assembly 100 according to one embodiment of the present disclosure. A box 102 of the truck 10 comprises a floor portion 104, two laterally spaced sidewalls 106 and 108 and a removable tailgate 110. The tailgate 110 includes a first end 112 and a second end 114. The first and second ends 112 and 114 are connected to the sidewalls 106 and 108, respectively, through hinge assemblies 100. When the tailgate 110 is at an opened position, the tailgate 110 forms an angle with the floor portion 104. At the fully opened position, the tailgate 110 may generally coplanar to the floor portion 104 as shown in FIG. 1. When the tailgate 110 is at a fully closed position, the tailgate is generally perpendicular with the floor portion 104. The hinge assemblies 100 allows rotation of the tailgate 110 from an opened position to a closed position and vice versa.

Figure 2:
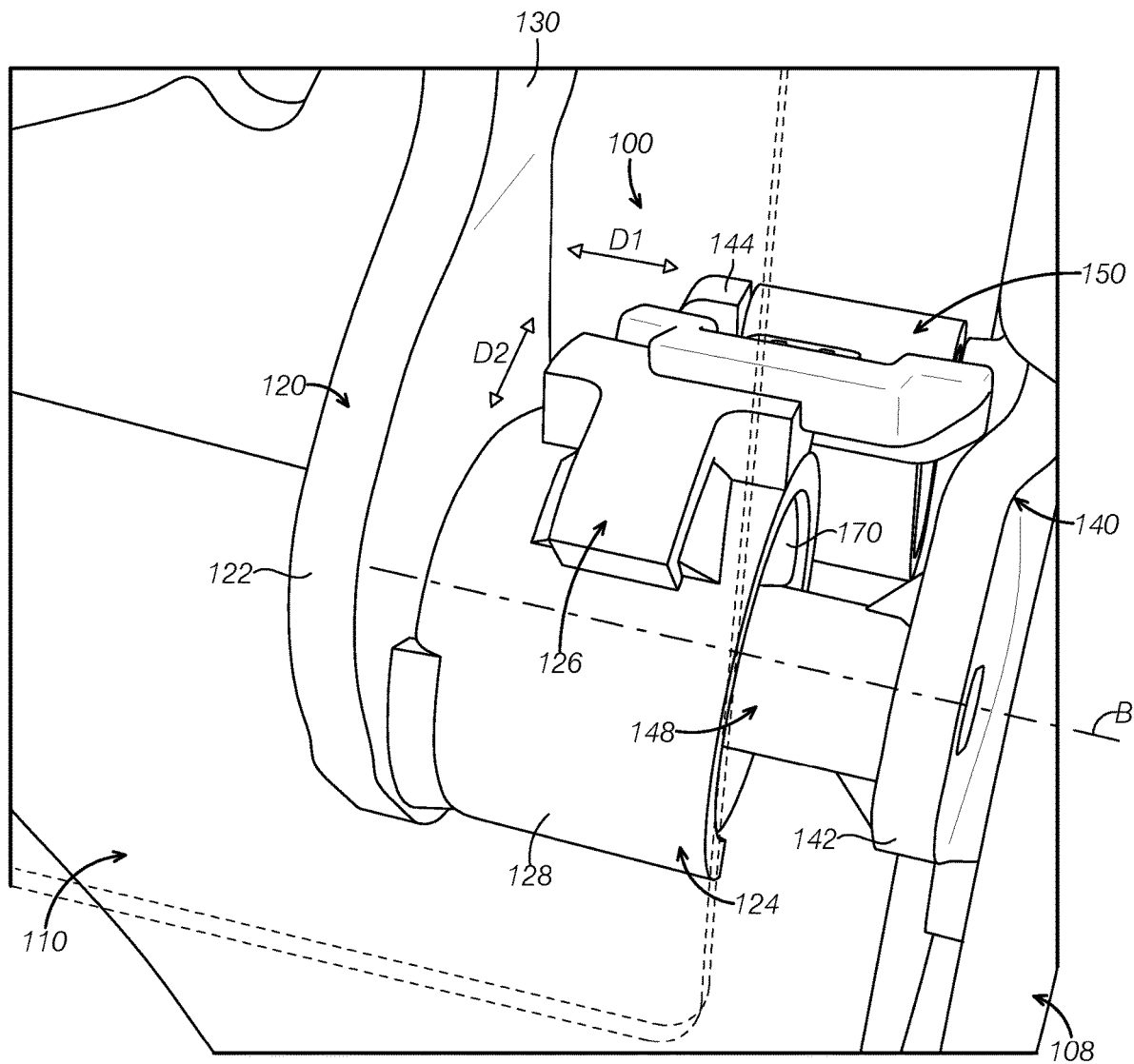
FIG. 2 is a perspective view of a hinge assembly according to one embodiment of the present disclosure.

FIG. 2 is a perspective view of a hinge assembly 100 according to one embodiment of the present disclosure. Referring to FIGS. 1 and 2, the truck 10 includes a removable tailgate 110 attached to a sidewall 108 disposed at a longitudinal direction L of the truck 10. The hinge assembly 100 comprises a first bracket 120 attached to a first part 110 and a second bracket 140 attached to a second part 108. In the depicted embodiment, the first bracket 120 is a tailgate bracket and the first part 110 is a tailgate.

Figure 3:
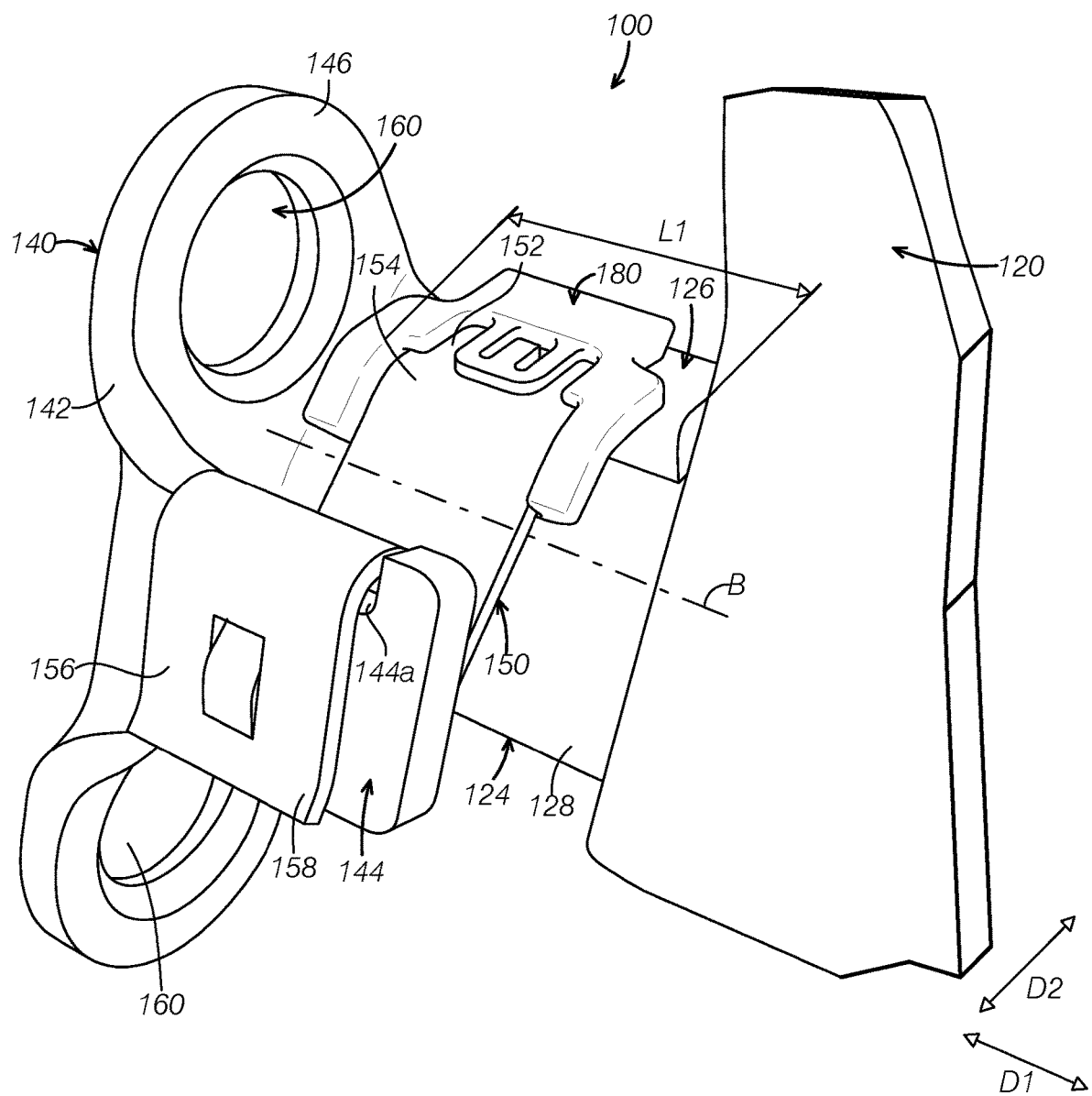
FIG. 3 is another perspective view of the hinge assembly in FIG. 2.
Figure 4:
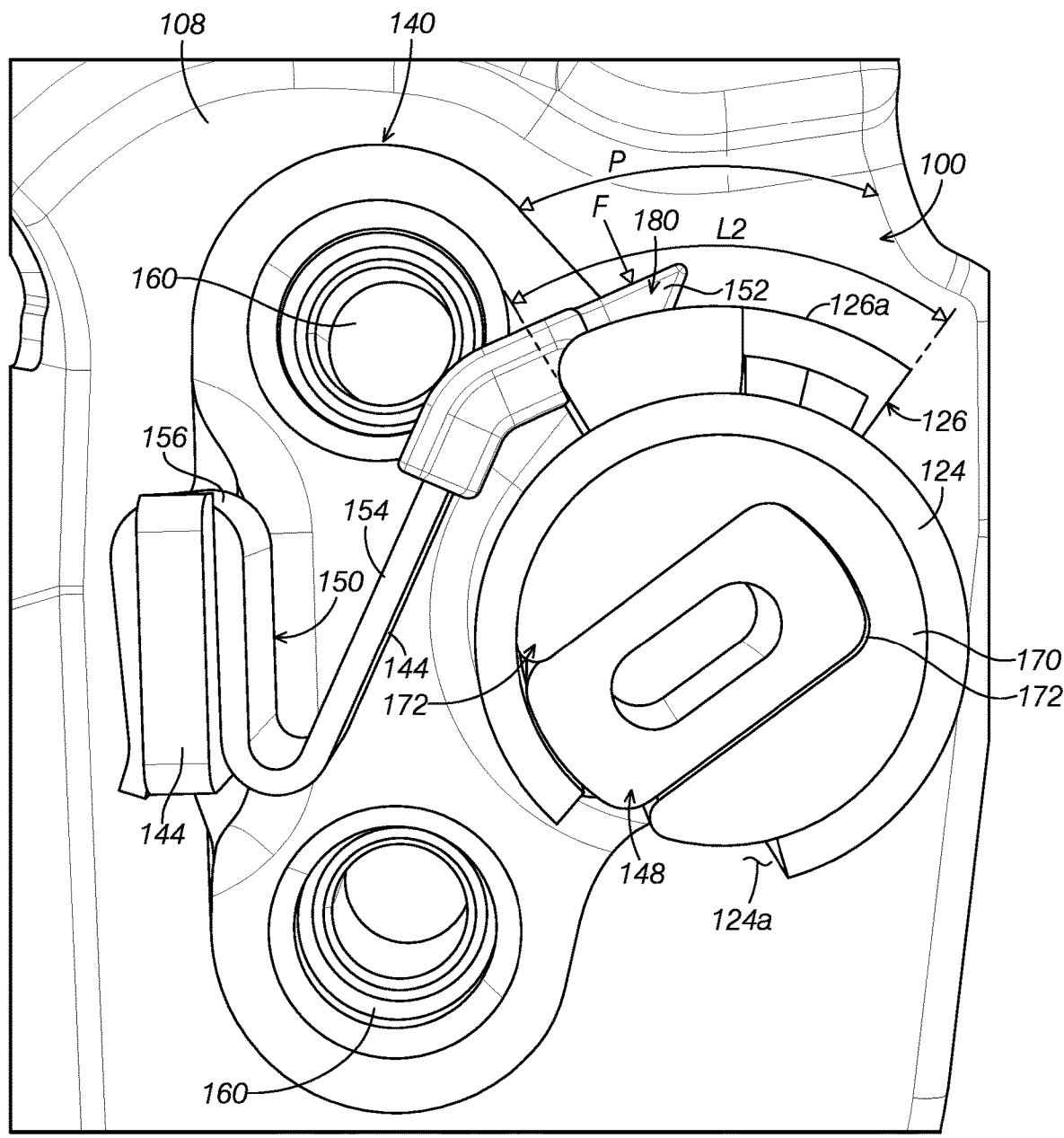
FIG. 4 is a side view of the hinge assembly in FIG. 2, illustrating the tailgate at a closed position.
Figure 5:
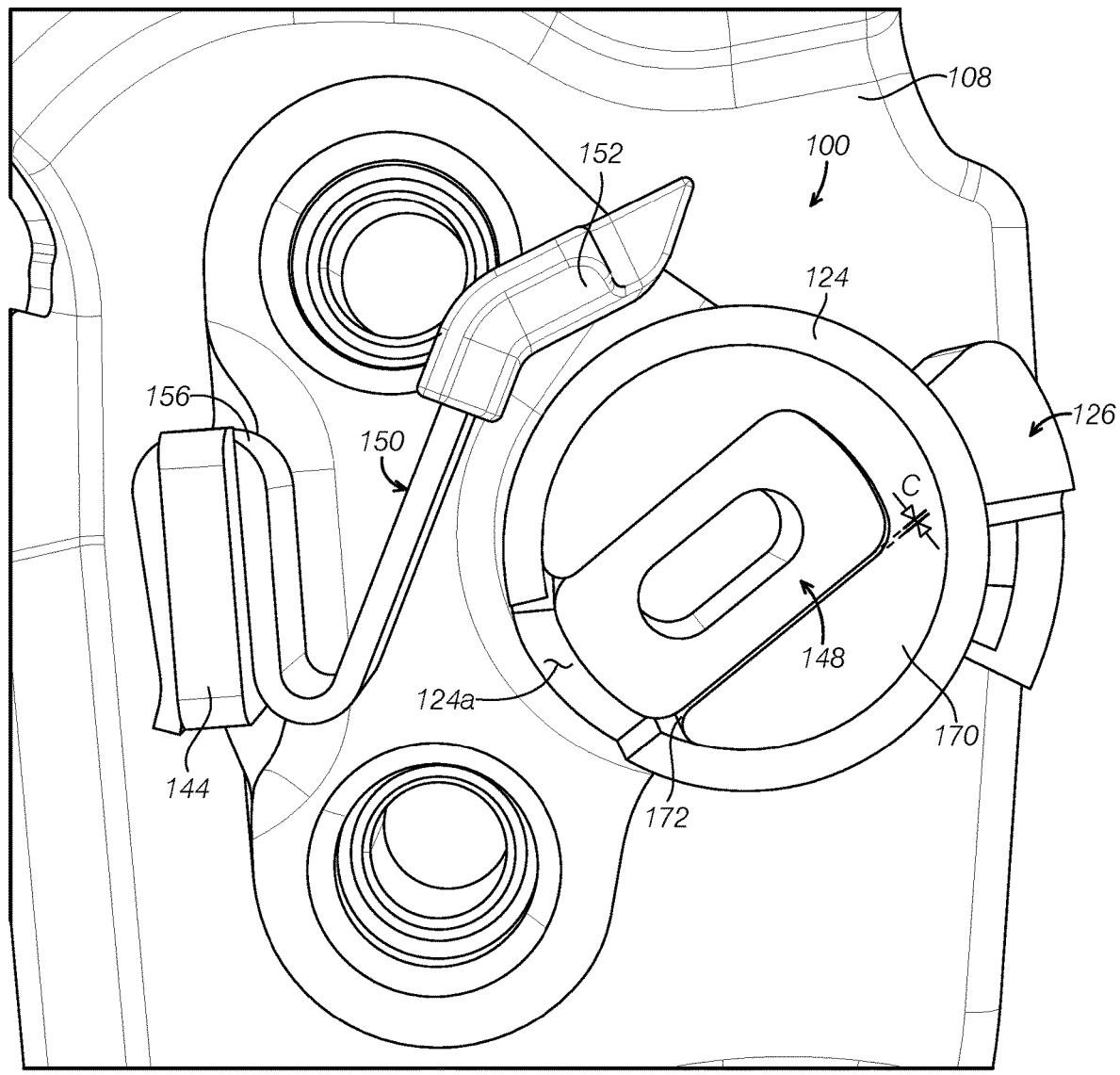
FIG. 5 is a side view of the hinge assembly with the tailgate in FIG. 2, illustrating the tailgate at an opened position.

With further reference to FIGS. 3-5, the tailgate bracket 120 includes a first base 122, a cup 124 extending from the first base 122 and an engagement member 126 disposed on the cup 124. The cup 124 is attached to the first bracket 120. In one embodiment, the cup 124 may be welded to the first bracket as shown in FIG. 2. The cross section of the cup 124 has a circular profile or an outer surface 128 of the cup 124 forms circular cylinder. In other words, the cup 124 may be a hollow annular cylinder. The cup 124 may have an opening 124a along an axial direction substantially parallel to an axis B of a pivot shaft 148. The engagement member 126 may be attached to the outer surface 128 of the cup 124.

Continuing with FIGS. 2-5, in the depicted embodiments, the second bracket 140 is a body bracket and the second part 108 is a sidewall to which the body bracket 140 is attached. The body bracket 140 includes a second base 142 and a cantilever 144 extending from the second base 142 towards the tailgate bracket 120. The second base 142 is disposed opposite to the first base 122 and forming an angle with the first base 122. In some embodiments, the second base 142 is substantially parallel to the first base 122 or a main surface 146 of the second base 142 and a main surface 130 of the first base 122 are substantially parallel each other. That is, the angle between the first base 122 and the second base 142 is about zero. The main surface 146 of the second base 142 and the main surface 130 of the first base 122 are substantially parallel to the sidewalls 106 and 108 of the truck 10. The cantilever 144 forms an angle with the main surface 146 of the second base 142. In some embodiment, the cantilever 144 may form an angle of 90 degrees with the main surface 146 of the second base 142. With further reference to FIG. 1, the body bracket 140 further comprises a resilient member 150 disposed on the cantilever 144 and extending at a longitudinal direction L of the truck or at a direction substantially perpendicular to the axis B of the pivot shaft 148.

The tailgate bracket 120 and the body bracket 140 may be connected via a pivot shaft 148. In some embodiments, the pivot shaft 148 is attached to the second base 142 of the body bracket 140 and removably connected to the tailgate bracket 120. The tailgate bracket 120 is connected to the body bracket 140 when the pivot shaft 148 connected to the body bracket 140 is received in the cup 124 of the tailgate bracket 120. The pivot shaft 148 extends between the tailgate bracket 120 and the body brackets 140 and pivotally connects them. In this way, the tailgate 110 is pivotally connected to the truck 10.

As can be seen from FIGS. 2-5, the engagement member 126 in the first bracket 120 engages the resilient member 150 of the second bracket 140 when the first part is at a first position and disengages the resilient member 150 when the first part is at a second position. In some embodiments, the first position is a closed position of the tailgate 110 and the second position is an open position of the tailgate 110.

FIG. 3 is a perspective view of the hinge assembly 100, illustrating a first position where the resilient member 150 contacts the engagement member 126. The first position is a position at which the tailgate 110 is closed. In some embodiments, the body bracket 140 has screw holes 160 for attachment to the sidewalls 106, 108 of the truck 10. As shown in FIG. 3, the engagement member 126 is connected to the outer surface 128 of the cup 124 and is located at a position to be able to contact the resilient member 150 of the body bracket 140 at the closed position. With further reference to FIGS. 2 and 4-5, the engagement member 126 extends at a first direction D1 substantially parallel to an axis B of the pivot shaft 148 or the pivot axis B. In the depicted embodiment, the engagement member 126 is a cam with a length at the first direction D1 and a width at a second direction D2 and disposed at an upper portion of the tailgate bracket 120 when the tailgate 110 is at the closed position.

The resilient member 150 is attached to the cantilever 144 and the cantilever 144 extends from the second base 142 of the second bracket 140. The resilient member 150 extends at a direction substantially perpendicular to the pivot axis B of the pivot shaft 148 toward the cup 24 and extends toward the engagement member 126. The resilient member 150 has a free end 152, a main body 154 and a fixed end 156. The fixed end 156 of the resilient member 150 is attached to the cantilever 144. In one embodiment, the cantilever 144 has a notch 144a to receive the fixed end 156 of the resilient member 150. In one embodiment, the fixed end 156 of the resilient member 150 includes a U-shaped portion 158. The U-shaped portion 158 sits on the notch 144a of the cantilever 144 and sandwiches the cantilever 144 such that the resilient member 150 is releasably connected to the cantilever 144. In some embodiments, the resilient member 150 is a leaf spring and is made of resilient metal such as spring steel. A lower surface of the free end 152 of the resilient member 150 may have an arc shape corresponding to the cam 126 to facilitate smooth engagement. At the open position of the tailgate, the free end 152 is spaced away from the outer surface 128 of the cup 124.

In some embodiments, the free end 152 of the resilient member 150 may be enclosed by a protective cover 180. The protective cover 180 may be made from material with desired friction reducing material such as polymer, plastic. In one embodiment, the protective cover 180 is over-molded on the free end 152 of the resilient member. In one embodiment, a lower surface of the protective cover 180 that contacts the engagement member 126 has a shape corresponding to a movement path P of the engagement member 126 or corresponding to an outer surface of the engagement member 126. The resilient member 150 contacts the engagement member 126 to apply a force on the cup 124 when the tailgate 110 is at a closed position and the resilient member 150 is distant from the engagement member 126 when the tailgate 110 moves away from the closed position. Since normal wear and tear of the resilient member 150 can occur during opening and closing operation of the tailgate, or through the introduction of loads from normal vehicle operation, the resilient member 150 is removably attached on the cantilever 144 which enables easy replacement.

FIG. 4 is a side view of the hinge assembly 100 at a first position or at the position when the tailgate 110 is closed. As shown in FIG. 4, the pivot shaft 148 is received in the cup 124. The pivot shaft 148 is attached to the body bracket 140 and the cup 124 is attached to the tailgate bracket 120, the tailgate bracket 120 is connected to the body bracket 140 when the pivot shaft 148 is received in the cup 124. In some embodiments, the tailgate bracket 120 includes a spacer 170 positioned inside the cup 124. The spacer 170 includes a recess 172 opened along an axial direction of the pivot shaft 148 or the pivot axis B and configured to receive the pivot shaft 148. At an assembled position, the spacer 170 is disposed between the pivot shaft 148 and an inner surface of the cup 124 and the spacer 170 is movable in the cup 124. The spacer 170 maintains a radial distance between the pivot shaft 146 and the cup 124 as they rotate together. The spacer 170 may be made of a material that has a low friction coefficient such as hard plastic. Upon complete insertion of the pivot shaft 148 in the recess 172 and at the assembled position, an outer surface of the pivot shaft 148 flushes with an outer periphery of the spacer 170. In some embodiments, a cross sectional area of the recess 172 is configured to be larger than a cross sectional area of the pivot shaft 148 to create a clearance to allow insertion and removal of the tailgate without the use of a tool. In some embodiments, a width of the recess 172 in a radial direction is slightly larger than a width of the pivot shaft 148 to provide a clearance C for smooth insertion and removal of the tailgate. In some embodiments, the radius of the spacer 170 is slightly smaller than the radius of the inner surface of the cup 124 to facilitate easy assembly of the spacer and to minimize friction during rotation of the cup 124 when the tailgate 110 is moved from a closed position to an opened position, and vice versa.

Referring to FIGS. 2-5, in the depicted embodiment, the engagement member 126 is a cam connected to the outer surface 128 of the cup 124. The cam 126 has a length L1 at a first direction D1 parallel to the pivot axis B and a width L2 at a second direction D2 perpendicular to the first direction D1. An outer surface 126a of the cam 126 is configured to provide a sufficient contact area with the resilient member 150 when the tailgate 110 is at a closed position. The outer surface 126a of the cam 126 may include an arc segment to facilitate the movement toward a position to contact the resilient member 150 when the tailgate 110 is rotated from an opened position to a closed position. The cam 126 is positioned such that it engages the free end 152 of the resilient member 150 when the tailgate is at the closed position. In some embodiments, the cam 126 may be at least partially disposed at an upper portion of the cup 124 when the tailgate 110 is at the closed position. In one example, during closing of the tailgate, the engagement of the cam 126 with the resilient member 150 may start when the tailgate 110 is at a position at approximately 10 degrees to a vertical plane and remains engaged up to and including when the tailgate 110 is fully closed.

Referring to FIG. 4, upon engagement, the resilient member 150 contacts the cam 126 to apply a force F on the cup 124. The force F is constantly applied as long as the resilient member 150 is in engagement with the cam 126. The force F on the cup 124 is transferred to the spacer 170 and then towards the pivot shaft 146 thereby preventing relative movements between the cup 124, spacer 170 and the pivot shaft 148 with respect to each other when the tailgate is in the closed position. Note that relative movement, and hence rattling noise, may occur due to clearances C between the cup 124, spacer 170 and the pivot shaft 148. These clearances are necessary for initial assembly of the hinge and for tailgate removal and refitting. In other words, the engagement of the resilient member 150 and the cam 126 creates an anti-rattling force to prevent the relative movement within the hinge assembly (e.g., between the cup 124, spacer 170 and the pivot shaft 148). Thus, the rattle noise generated during driving of the truck can be eliminated or reduced.

FIG. 5 shows a side view of the hinge assembly 100 with the tailgate at an opened position. The opened position refers to a condition that the tailgate 110 is opened from the partially to fully opened condition. During the opening of the tailgate, as the tailgate 110 rotates away from the fully closed position as shown in FIG. 4, the cam 126 disengages from the resilient member 150 after a certain degree of rotation. Upon disengagement, the resilient member 150 loses its contact with the cam 126 and does not apply any force on the cup 124. At the opened position, the tailgate 110 can rotate freely.

In some embodiment, the hinge assembly 100 may be designed to allow the insertion and removal of the tailgate 110. Between the fully closed and fully opened positions of the tailgate 110, there is a specific orientation intended for inserting or removing the tailgate 110. In this specific orientation as shown in FIG. 5, the recess 172 in the spacer 170 aligns with the opening 124a in the cup 124 such that the pivot shaft 148 can slide from the spacer 170 to facilitate removal of the tailgate 110. The tailgate 110 pivots along the axis B of the pivot shaft 148 between the fully opened position open and a closed position. At any orientation other than this specific orientation intended for insertion or removal of the tailgate, the recess 172 in the spacer 170 does not align with the opening 124a in the cup, thereby preventing sliding out of the pivot shaft 148 and hence preventing removal of the tailgate 110. If the user wants to detach and remove the tailgate 110, the tailgate 110 can be rotated to this specific orientation and then pulled away from the sidewalls of vehicle. The resilient member 150 does not impede the tailgate 110 removal or refitting process.

Figure 6:
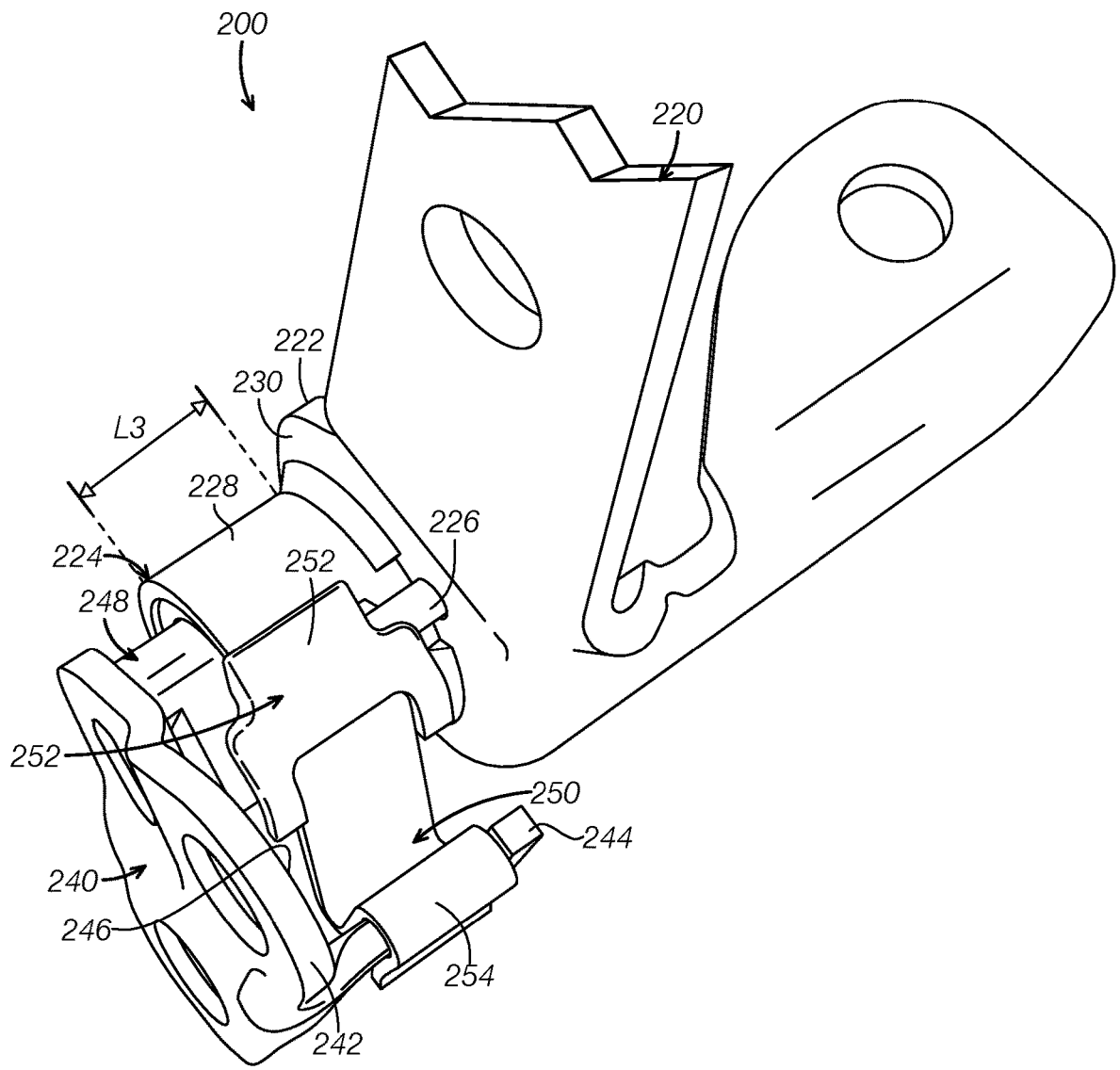
FIG. 6 is a perspective view of a hinge assembly according to another embodiment of the present disclosure, illustrating a position when the tailgate is at a closed position.
Figure 7:
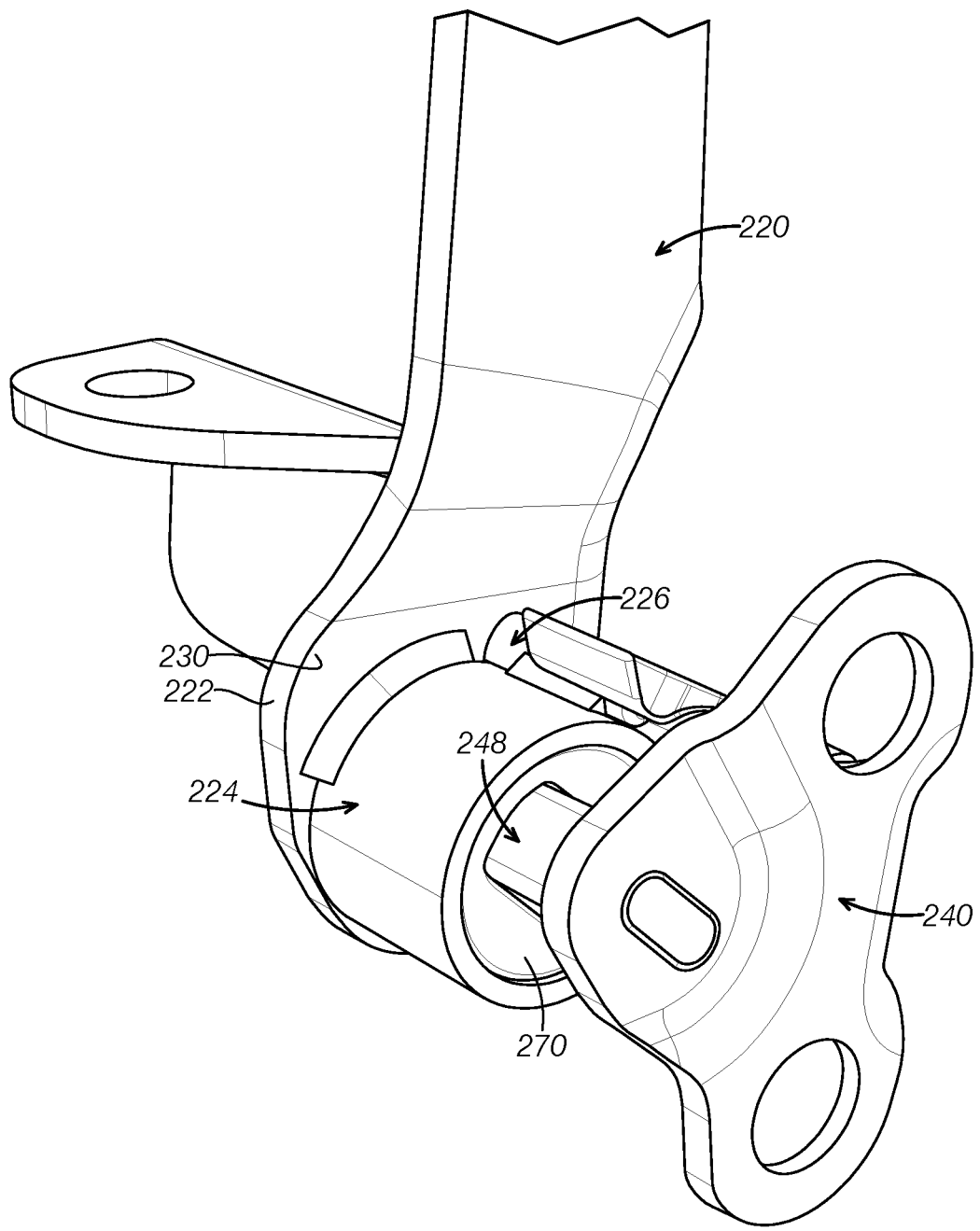
FIG. 7 is another perspective view of the hinge assembly in FIG. 6, illustrating a position when the tailgate is at a closed position.
Figure 8:
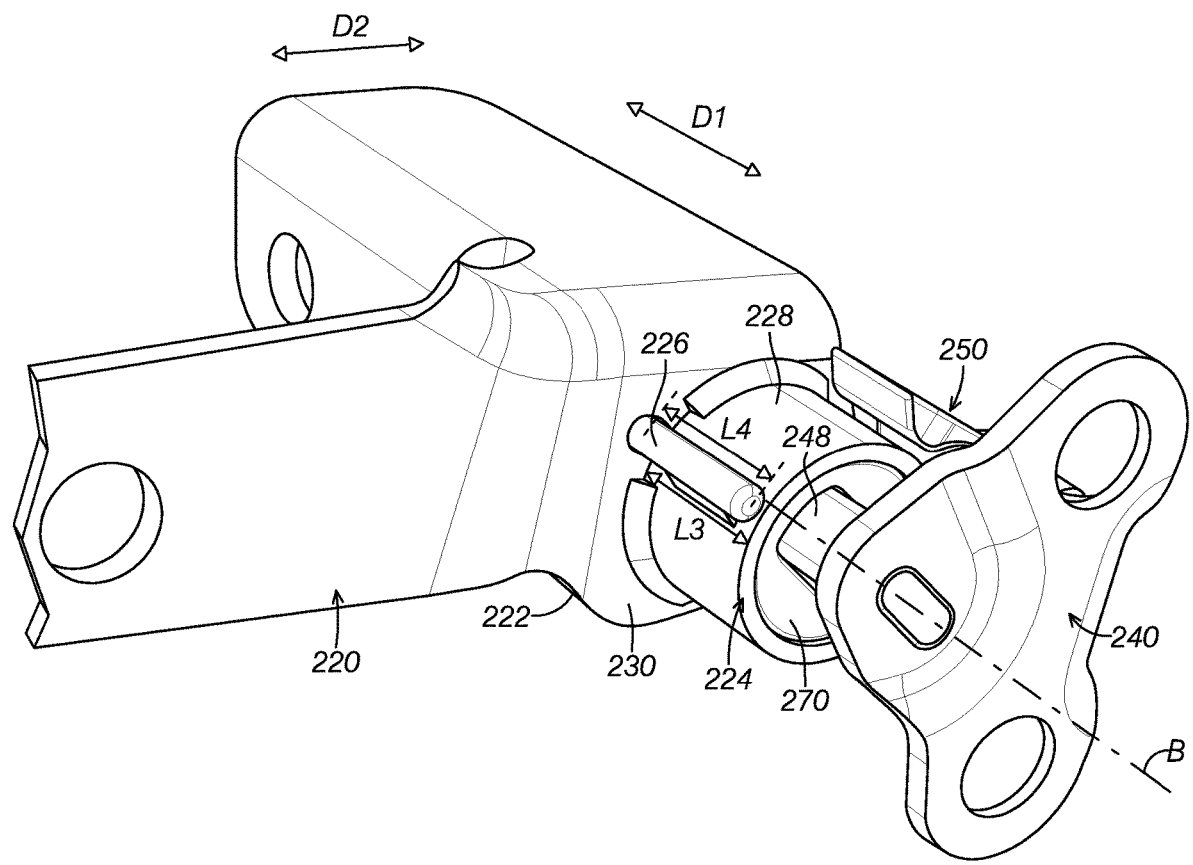
FIG. 8 is another perspective view of the hinge assembly in FIG. 6, illustrating a position when the tailgate is at an opened position.

FIGS. 6-8 show perspective views of a hinge assembly 200 according to another embodiment of the present disclosure. For the sake of brevity, in this embodiment, the elements and features similar to those previously shown and described will not be described in much further detail. The hinge assembly 200 comprises a tailgate bracket 220 including an engagement member 226; a body bracket 240 including a resilient member 250; and a cup 224 attached to the tailgate bracket 220; a pivot shaft 248 received in the cup 224 to pivotally connect the tailgate bracket 220 and the body bracket 240. The tailgate bracket 220 is attached to a tailgate (not shown) and the body bracket 240 is attached to a sidewall of the vehicle (not shown).

As shown in FIGS. 6-7, the engagement member 226 engages the resilient member 250 when the tailgate is closed. As shown in FIG. 8, the engagement member 226 disengages the resilient member 250 when the tailgate is at an opened position. The tailgate bracket 220 includes a first base 222 and the body bracket 240 includes a second base 242 forming an angle with the first base 222. In some embodiments, the second base 242 is substantially parallel to the first base 222 or a main surface 246 of the second base 242 and a main surface 230 of the first base 222 are substantially parallel each other. That is, the angle between the first base 222 and the second base 242 is about zero.

The cup 224 extends from the main surface 230 of the first base 222 and is connected to the first base 222. The cup 224 may be connected to the first base 222 with any appropriate means such as welding. The cup 224 is configured to receive the pivot shaft 248 that is connected to second base 242 of the body bracket 240. The cup 224 has a length L3 at a first direction D1 substantially parallel to a pivot axis B of the pivot shaft 248.

The resilient member 250 is connected to the body bracket 240 and extends towards the cup 224. In the depicted embodiment, the resilient member 250 is a leaf spring and disposed between the first base 222 of the tailgate bracket 220 and the second base 242 of the body bracket 240. The leaf spring 250 may include a free end 252 and a fixed end 256. The fixed end is connected to a cantilever 244 extended from the second base 242 of the body bracket 240.

In some embodiments, the engagement member 226 may be an annular rod extending from the main surface 230 of the first base 222 and connected to an outer surface 228 of the cup 224.

The annular rod 226 may be attached to the outer surface 228 of the cup 124 by any appropriate means such as welding. A length L4 of the annular rod 226 is configured such that a sufficient contact is provided when the annular rod 226 engages the free end 252 of the leaf spring 250. In some embodiments, the contact between the annular rod 226 and the free end 252 of the leaf spring 250 may be a line when the tailgate is closed. In one embodiment, the length L4 of the annular rod 226 may substantially equal to the length L3 of the cup 224. The annular rod 226 may be positioned at an upper portion of the cup 224 and contacts the leaf spring 250 at the closed position of the tailgate. In one embodiment, the first base 222 of the tailgate bracket 220 has a hole 232 through which the annular rod 226 passes and welded to the cup 224. The free end 252 of the leaf spring 250 may include a curved lower surface corresponding to the outer surface 228 of the cup 224.

FIGS. 6-7 shows the positions of the leaf spring 250 and the annular rod 226 when the tailgate is at a closed position. At the closed position, the leaf spring 250 engages the annular rod 226 and applies a force to restrict the relative movement between the cup 224, the spacer 270 and the pivot shaft 248. In this way, the rattling generated at some driving conditions such as driving on a rough road can be eliminated or reduced.

FIG. 8 show the positions of the leaf spring 250 and the annular rod 226 when the tailgate is at an opened position. At the opened position, the annular rod 226 is moved away from the leaf spring 250 with the tailgate bracket 220. Once the annular rod 226 is disengaged with the leaf spring 250, the tailgate is rotated freely without the additional force.

The hinge assemblies of the present disclosure can eliminate or reduce the rattle generated during some driving conditions while allowing normal operation of opening and closing of the tailgate.

Figure 9:
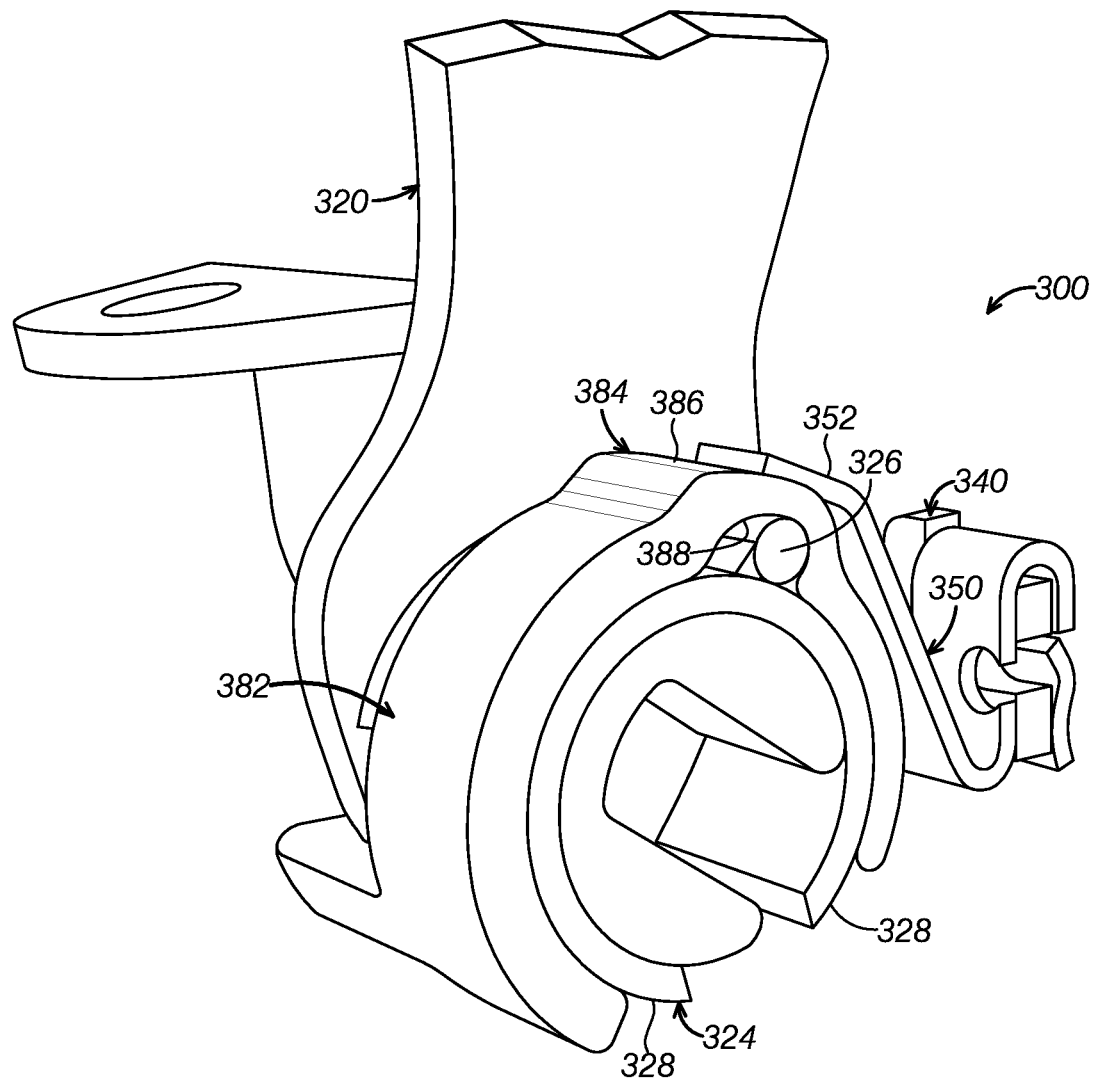
FIG. 9 is a perspective view of a hinge assembly according to yet another embodiment of the present disclosure, illustrating a position when the tailgate is at a closed position.

FIG. 9 shows a perspective view of a hinge assembly 300 according to another embodiment of the present disclosure. For the sake of brevity, in this embodiment, the elements and features similar to those previously shown and described will not be described in much further detail. The hinge assembly 300 comprises a tailgate bracket 320 including an engagement member 326; a body bracket 340 including a resilient member 350; and a cup 324 attached to the tailgate bracket 320; a pivot shaft (not shown) connected to the body bracket 340 and received in the cup 324, and configured to pivotally connect the tailgate bracket 320 and the body bracket 340. The tailgate bracket 320 is attached to a tailgate (not shown) and the body bracket 340 is attached to a sidewall of the vehicle (not shown). The engagement member 326 may be a rod such as an annular rod. The resilient member 350 may be a leaf spring.

In some embodiments, the hinge assembly 300 further comprises a sleeve 382. The sleeve 382 extends on an outer surface 328 of the cup 324 at a circumferential direction, encloses the rod 326 and partially encloses the cup 324. The sleeve 382 may include a raised portion 384 for receiving the rod 326. The rod 326 prevents the sleeve 382 from rotating about the pivot axis over the outer surface 328 of the cup 324. An outer surface 386 of the raised portion 384 is configured to provide a surface to interface with the leaf spring 350 and the outer surface 386 may have a contour corresponding to a shape of a free end 352 of the leaf spring 350. The sleeve 382 may be made from plastic or composite fiber material. In the depicted embodiment, the leaf spring 350 contacts the raised portion 384 of the sleeve 382 without direct touching the rod 326 and thus avoid wearing of a painted rod surface caused by direct contact between the rod 326 and the leaf spring 350. In some embodiments, the sleeve 382 may further include a clipping feature to secure it from movement in the pivot direction when fitted.

Features of the disclosed examples provide a tailgate hinge with an anti-rattle feature, which permits the quick attachment and detachment of the tailgate while preventing audible rattle noise during driving.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A hinge assembly, comprising:
a first bracket attached to a first part and including an engagement member;
a second bracket attached to a second part and including a resilient member; and
a pivot shaft pivotally connecting the first and second brackets,
wherein the engagement member engages the resilient member when the first part is at a first position and disengages the resilient member when the first part is at a second position.

2. The hinge assembly of claim 1, wherein the first bracket includes a cup and the cup is configured to receive the pivot shaft, wherein the engagement member is connected on an outer surface of the cup and extends at a first direction substantially parallel to an axis of the pivot shaft, and wherein the resilient member is a leaf spring extending at a second direction substantially perpendicular to the axis of the pivot shaft.

3. The hinge assembly of claim 2, wherein the engagement member is an annular rod attached to the outer surface of the cup.

4. The hinge assembly of claim 2, wherein the engagement member is a cam mounted on the outer surface of the cup, and an outer surface of the cam has an arc shape and is mounted at a position to enable the cam to contact the leaf spring such that a force is applied toward the pivot shaft when the first part is at the first position and the force is removed when the cam is spaced away from the leaf spring at the second position.

5. The hinge assembly of claim 1, wherein the first part is a tailgate of a truck, and the second part is a sidewall of the truck and wherein the first position is a position at which the tailgate is closed and the second position is a position at which the tailgate is opened.

6. A hinge assembly for connecting a tailgate to a sidewall of a vehicle, comprising:
   a tailgate bracket including:
      a first base,
      a cup extending from the first base,
      an engagement member connected to an outer surface of the cup;
   a body bracket including:
      a second base,
      a cantilever extending from the second base towards the tailgate bracket,
      a resilient member disposed on the cantilever and extending toward the engagement member; and
   a pivot shaft connected to the body bracket and received in the cup,
   wherein a free end of the resilient member contacts the engagement member to apply a force on the cup when the tailgate is at a closed position and the resilient member is distant from the engagement member when the tailgate is an opened position.

7. The hinge assembly of claim 6 wherein the resilient member is a leaf spring and the first base is substantially parallel to the second base.

8. The hinge assembly of claim 7, wherein the leaf spring is made from metal and the free end of the leaf spring is enclosed by a protective cover and the protective cover is a polymer-based part molded on the free end of the leaf spring and the free end of the leaf spring includes a curved lower surface corresponding to a moving path of the engagement member.

9. The hinge assembly of claim 7, wherein the cantilever of the body bracket has a notch to receive the leaf spring.

10. The hinge assembly of claim 9, wherein a fixed end of the leaf spring includes a U-shaped portion and the U-shaped portion sits on the notch and sandwiches the cantilever such that the leaf spring is releasably connected to the cantilever.

11. The hinge assembly of claim 7, wherein the engagement member is a cam connected on the outer surface of the cup and positioned such that the cam engages the free end of the leaf spring when the tailgate is at the closed position and the cam is distant away from the leaf spring to leave a clearance between the cam and the leaf spring at the opened position.

12. The hinge assembly of claim 11, wherein the cam is welded to the outer surface of the cup and the cam includes an arc segment.

13. The hinge assembly of claim 7, wherein the engagement member is an annular rod attached to the outer surface of the cup, the annular rod extends from the first base of the tailgate bracket toward the body bracket and is substantially parallel to an axis of the pivot shaft.

14. The hinge assembly of claim 13, wherein the annular rod faces the leaf spring and is positioned at an upper portion of the cup at the closed position.

15. The hinge assembly of claim 13, further comprising a plastic sleeve extending on an outer surface of the cup at a circumferential direction and partially enclosing the cup, wherein the sleeve includes a raised portion, an inner surface of the raised portion is configured to receive the annular rod and an outer surface of the raised portion is configured to interface the leaf spring and the outer surface has a contour corresponding a shape of the free end of the leaf spring.

16. The hinge assembly of claim 6, wherein the tailgate bracket further includes a spacer positioned between the pivot shaft and wherein the cup includes an opening along an axial direction of the pivot shaft and the spacer includes a recess at the axial direction and configured to receive the pivot shaft.

17. A truck, comprising:
   a bed portion;
   a first sidewall;
   a second sidewall;
   a tailgate connected to the first and second sidewalls and movable between an opened position and a closed position; and
   a first hinge assembly and a second hinge assembly to pivotally connect the tailgate to the first and second sidewalls, respectively, each of the first and second hinge assemblies including
      a tailgate bracket connected to the tailgate, the tailgate bracket including
         a first base substantially parallel to the first and second sidewalls, a cup connected to the first base and extending along a pivot axis of the tailgate, an engagement member extending along an outer surface of the cup and connected to the cup,
      a body bracket connected to the first sidewall or the second sidewall and including a second base substantially parallel to and attached to the first sidewall or the second sidewall, a cantilever extending from the second base toward the tailgate and spaced away from the cup, and a leaf spring, wherein the leaf spring has a free end, a fixed end and a main body, the fixed end is mounted to the cantilever,
      a pivot shaft connected to the second base and extending from the second base and received in the cup,
   wherein the engagement member engages the free end of the leaf spring when the tailgate is at a closed position and disengages the free end when the tailgate is at an opened position.

18. The truck of claim 17, further comprising a spacer between the cup and the pivot shaft, wherein there is a clearance between the spacer and the pivot shaft and a clearance between the spacer and the cup to facilitate removal and installation of the tailgate to the first and second sidewalls, and the spacer is made from plastic material.

19. The truck of claim 18 wherein the engagement member includes an annular rod connected to the cup and extending along a direction perpendicular to an axis of the pivot shaft.

20. The truck of claim 18, wherein the engagement member is a cam connected to an outer surface of the cup and positioned such that the cam contacts the free end of the leaf spring at the closed position and is distant from the free end of the leaf spring at the opened position.

* * * * *